July 11, 1933.  J. C. NELMS  1,917,318
MINING APPARATUS
Filed April 10, 1931   3 Sheets-Sheet 1

July 11, 1933.  J. C. NELMS  1,917,318
MINING APPARATUS
Filed April 10, 1931  3 Sheets-Sheet 2

Inventor
Joseph C. Nelms,
By Macklin, Soule & Leonard,
Attorneys

July 11, 1933.   J. C. NELMS   1,917,318
MINING APPARATUS
Filed April 10, 1931   3 Sheets-Sheet 3
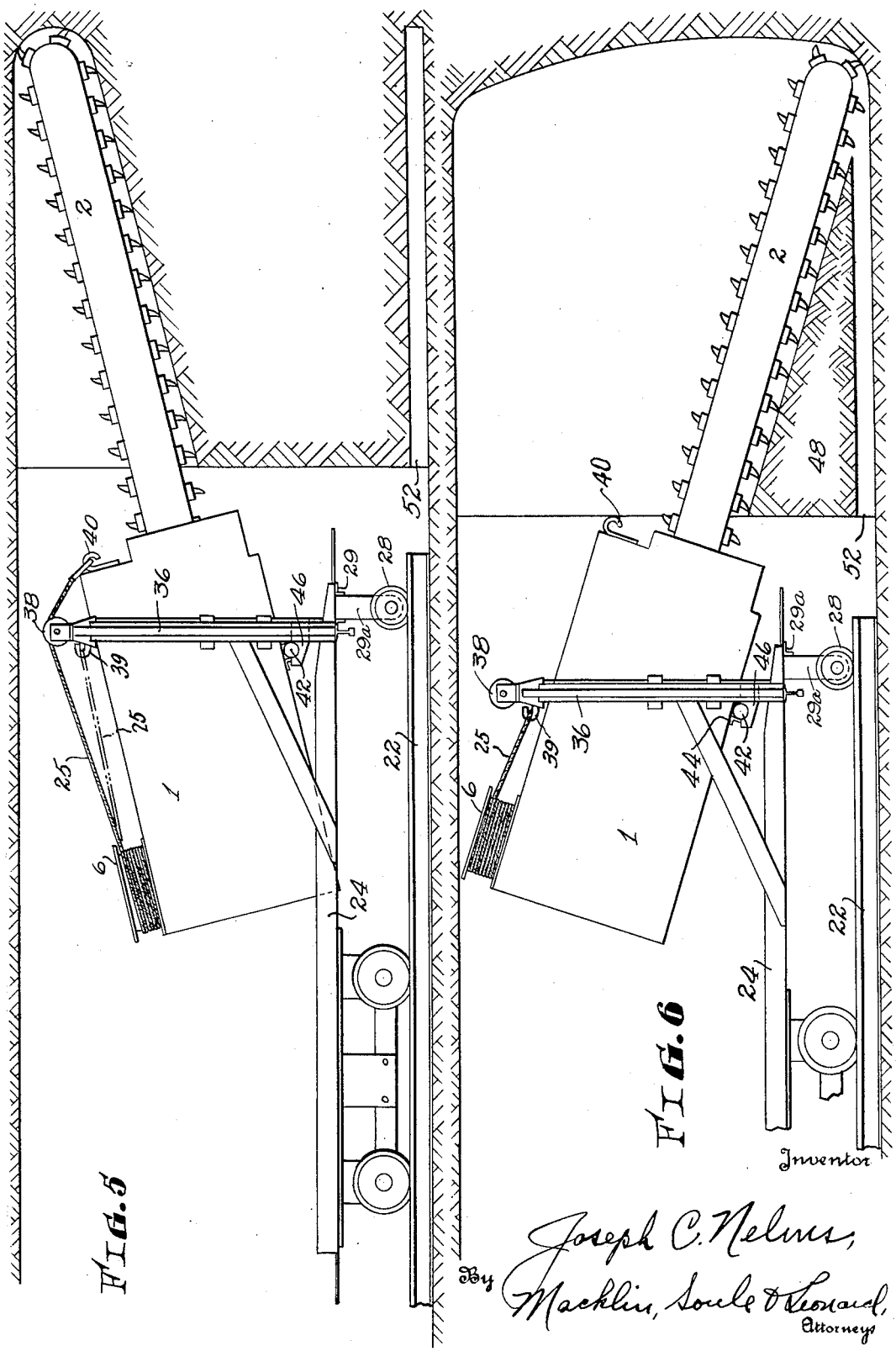

Patented July 11, 1933

1,917,318

UNITED STATES PATENT OFFICE

JOSEPH C. NELMS, OF EAST CLEVELAND, OHIO, ASSIGNOR TO THE OHIO & PENNSYLVANIA COAL COMPANY, OF CLEVELAND, OHIO, A CORPORATION OF OHIO

MINING APPARATUS

Application filed April 10, 1931. Serial No. 529,070.

This invention relates to a method and apparatus for mining coal and more particularly to an auxiliary apparatus for and method of handling a horizontal kerf cutting machine so that it may be used to cut kerfs at various angles to the horizontal or vertical.

The mining machines heretofore used are of two general classes. One class comprises a machine adapted to skid about on its bottom on the mine floor for cutting horizontal kerfs only. This machine is comparatively simple and utilizes an orbital cutter rigidly fixed in position longitudinally of the machine body. The machine body has self contained motor and driving gears for operating the orbital cutter. In order to move the machine about on the mine bottom, suitable winding drums operated from the same motive means are provided on the machine body. These drums, through operative association with cables secured to the usual jack pipes or anchor pins in the mine walls or floor in various positions are adapted to direct and skid the machine about the mine floor for positioning and cutting.

The other class of machines is more complicated and bulky. In the most generally used form, the orbital cutter is mounted on a turntable head from which it extends forwardly and longitudinally of the machine, parallel to the axis of the head. The cutter is secured to the turntable head eccentrically of the axis thereof. The rearward end of the cutter is pivotally mounted on the head at its point of connection therewith by a pivot extending normal to the turntable head axis, thus providing a quasi-universal connection between the cutter and main body of the machine. With this mounting the cutter may be swung in a wide arc about its pivot in any number of planes parallel to and spaced from the turntable axis such planes being determined by the position to which the turntable head is rotated.

The first class of machines has the advantage of simplicity and great economy and compactness, but has the disadvantage of being limited in use to cutting horizontal kerfs only. It has, however, an additional advantage in that it will cut kerfs of any width desired, the entire machine moving bodily transversely of the mine room or seam of the material to be cut.

Furthermore, by the use of this machine the side walls of the kerf are straight and lie in the planes of the side walls of the seam and intersect the rear wall of the cut at approximately 90°, instead of being arcuate and gradually merging the side walls into the rear wall. Thus the corner portions of the material are undermined, effecting economies which will be more fully described later. The turntable head type of machine is limited to the width of cut that can be made thereby without transverse movement of the machine. Again, assuming a horizontal cut is being made, the rear wall of the cut is arcuate in outline, and a large amount of uncut material is left at the rear corners as above mentioned. Consequently, when the coal or other material being mined is broken loose, this corner portion is shattered or otherwise broken up and a less amount of large lump is obtained. Since the machine is carried on tracks at all times it is impractical to move it laterally across the mine floor and thus it is adapted only for longitudinal movement, the lateral cutting being accomplished by swinging the orbital cutter about its pivot in an arcuate path. By the use of a nine foot cutter, for instance, an eighteen foot width is the maximum that could be cut and this cut would not be rectangular, but instead, in the form of a semi-circle of nine foot radius.

It is one of the objects of this invention to provide an auxiliary apparatus for use in combination with the first type of machine so as to obtain the advantages of its simplicity and compactness and a rectangular cut of full width at the rear corners and at the same time render it suitable for cutting one or more vertical kerfs. By the use of such a machine, especially in wide coal seams, an increase in amount of large lumps as high as 15% is obtainable.

Further, the initial cost of the machine, the ease of handling and the small cost of auxiliary equipment, make possible the mining of coal and other materials much more economically and much more rapidly than with any of the machines heretofore used in the usual manners described.

Other objects and advantages will become apparent from the following specification in which reference is made to the drawings, wherein—

Fig. 5 illustrates the machine in its raised position in the frame at the beginning of the cutting of a vertical kerf.

Fig. 6 is an elevation showing the machine at the end of the vertical cutting operation.

The cutting machine may be of the type described in Letters Patent No. 1,686,140, issued Oct. 2, 1928 to W. T. McCullough and other patents cited therein and reference may be had to these patents for details of construction.

Figure 1:
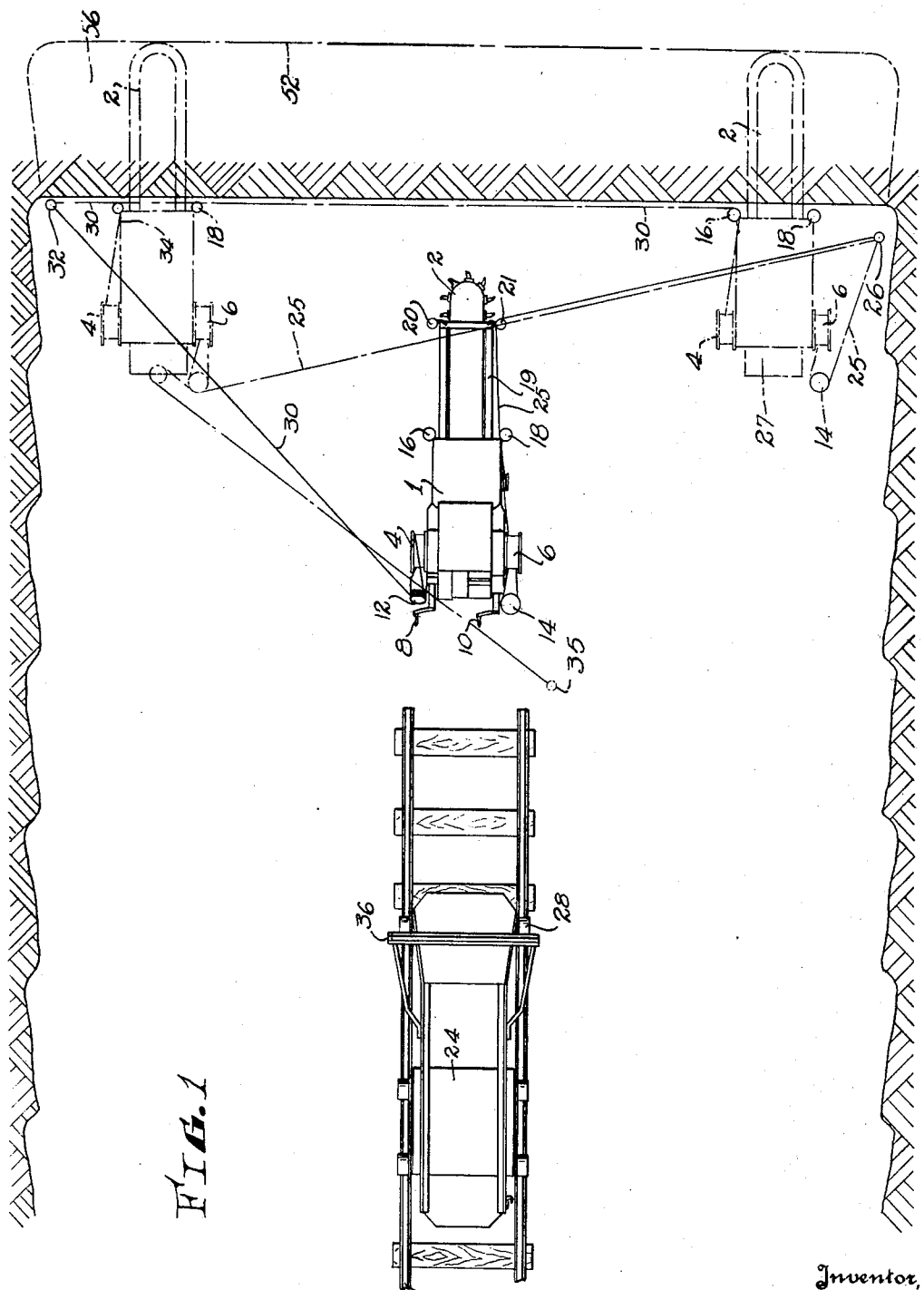
Fig. 1 is a plan view of a cutting machine showing the manner in which horizontal kerfs are cut therewith.

The cutting machine with which this invention is to be used comprises a closed body 1, in which are contained a motor, preferably an electrical motor, and suitable gearing for purposes later to be described. The body which is somewhat greater in length than in its other dimensions carries at the forward end an orbital cutter 2. This cutter protrudes from the body, extending longitudinally thereof, and is usually rigidly secured thereto, so that, when the machine is resting on its base on the mine floor, as shown in Fig. 1, the cutter 2 lies in a plane parallel to and substantially in the plane of the floor. This cutter is driven from the motor and gears contained in the body of the machine. Mounted on the body 1 are cable winding drums 4 and 6, which are adapted to be connected selectively to the motive means in the body by suitable clutches operated by respective levers 8 and 10. The drum 4 is omitted from the showing in Figs. 5 and 6 for convenience in illustration. On the side of the rear end of the machine are pulleys or other guides 12 and 14 respectively. Similar guides 16 and 18 are provided on the front of the body. A frame 19 is mounted on the machine so as to be slidable longitudinally of the body and cutter, and surrounds the cutter when the frame is in the forwardly extended position. At its forward end the frame is equipped with pulleys 20 and 21, the purpose of which will later be described.

To facilitate moving the machine into the seam and longitudinally thereof, a suitable track 22 is provided on which operates a truck 24 adapted to support the cutting machine. This track terminates a short distance from the end wall of the room. The truck carrying the machine is moved near the position to be used. Cables are then anchored at one end to suitable jack pipes in the walls or floor of the mine room and the other ends passed around the drums. The winding drums are operated to tighten the cables to skid the machine off from the truck onto the mine floor and to skid it thereupon to position the cutter against the end wall of the mine. The cables are further tightened and the orbital cutter operated so as to cut a kerf along the side wall and into the end wall, the length of which kerf measured longitudinally of the seam is equal to the length of the cutter. The cables are then transferred and connected so that when the drums are operated they will cause the cutter to move transversely of the room while the orbital cutting arm is positioned longitudinally of the room. In this manner a kerf extending into the end wall the full length of the cutting arm and of any desired width transversely of the room may be cut.

When it is desired to cut vertical kerfs, the cables are transferred to the truck so that the machine winds itself back onto the truck with the orbital cutter in a horizontal position.

For example, referring to Fig. 1, the truck is moved longitudinally of the room to within a short distance of the end wall and a cable 25 secured on the drum 6 is threaded through pulleys or guides 18 and 21 and the free end of the cable is secured to an anchor pin 26 close to the side wall of the mine and a short distance from the end wall. A cable 30 is fastened over the drum 4 and through the guide 12 and to an anchor pin 32 at the opposite side of the room and close to or substantially against the end wall. The drum 6 is then operated to wind up the cable 25 and the drum 4 is concurrently operated to slack off the cable 30. This operation moves the machine into a position designated by the dotted lines 27. The orbital cutter is then operated and the cable 25 concurrently wound so that the cutter cuts a kerf into the end wall parallel to and along the side walls of the room, and the guides 18 and 21 are brought together and up to the anchor pin 26. The cable is then removed from the guides 18 and 21 and passed through the guide 14, the free end remaining secured to the anchor pin 26. As the rotary cutter continues its cutting movement, the drum 6 is additionally operated to further wind up the cable 25 so as to pull the rear end of the cutting machine toward the anchor pin and thrust the forward end of the cutter deeper into the end wall of the shaft until it has cut its full depth thereinto.

When this is accomplished, the cutting machine extends longitudinally of the room and is positioned against the side wall. The cable 30 operatively secured on the drum 4 is then passed through the guide 16, and secured to an anchor pin 32 at the other side of the shaft. Upon operation of the drum 4 the cable 30 is tightened, thus pulling the entire machine body across the mine floor, the amount of winding on and slacking of the cables being correlated to the rate of cutting of the cutter. The tension on the cable 30 tends to pull the rear end of the machine toward the pin 32 and so the cable 25 is maintained on the guide 14 to hold the rear end of the machine in proper alignment. This cable is paid out at the same rate that the cable 30 is taken up, so that the machine moves transversely of the room while aligned longitudinally thereof until it reaches the position designated in dotted lines at 34.

After the cutting operation one of the cables may be attached to an anchor pin 35 and wound up to withdraw the machine from the end of the shaft. Obviously in this manner a kerf of any width may be cut.

In order to position the machine for cutting vertical kerfs, the truck 24 is provided at its forward end with detachable wheels 28. As better illustrated in Figures 3 to 6 a convenient mounting for the wheels 28 includes transversely aligned brackets 29 arranged at each side of the track. The wheels 28 are provided with stud shafts rigidly secured to complementary brackets 29a adapted to be slid axially one into each of the brackets 29 respectively.

Figure 3:
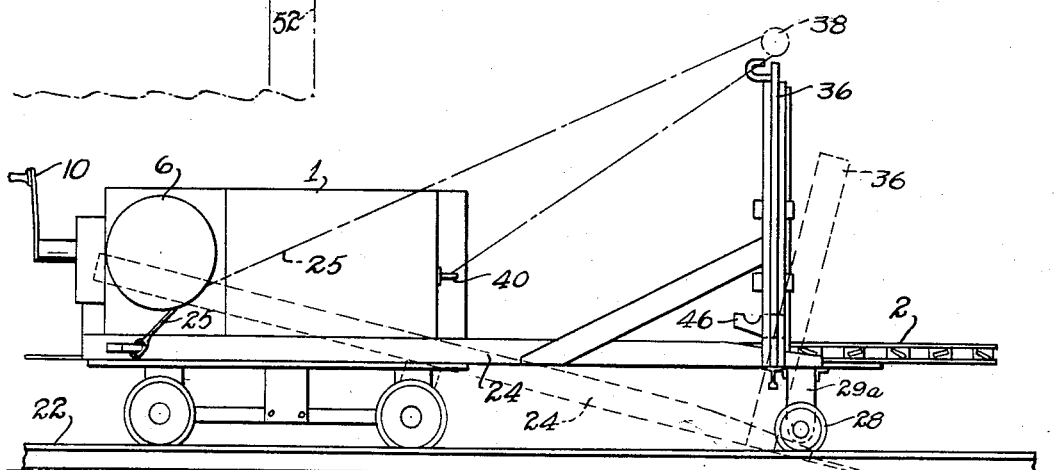
Fig. 3 is a side elevation of the apparatus illustrated in Fig. 2.
Figure 4:
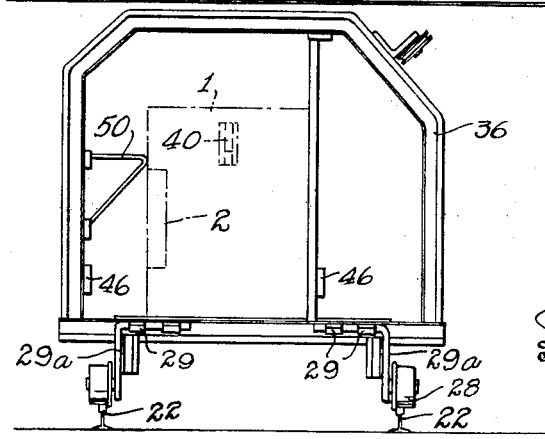
Fig. 4 is a front end view of the auxiliary truck and frame.

When the wheels 28 are removed, the forward end of the truck 24, which extends beyond the next set of wheels, due to its weight, tilts downwardly as indicated by the dotted line in Figure 3. Thus the forward edge of the truck platform rests on the mine floor and the platform slopes upwardly rearwardly forming an inclined plane upon which the machine 1 may easily be drawn. When the machine is drawn to the rear of the truck platform, the platform tilts to its horizontal position and the wheels 28 are again attached.

Figure 2:
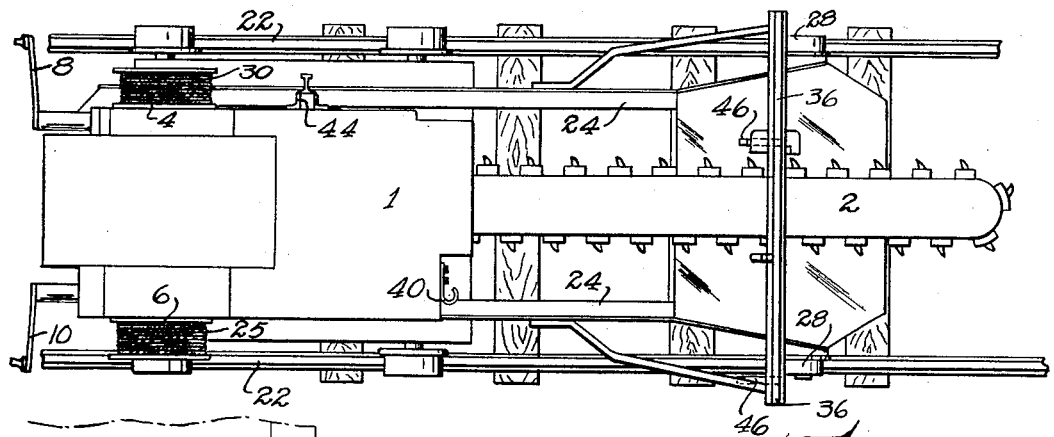
Fig. 2 is a plan view of the auxiliary apparatus with which this invention is particularly concerned, showing the cutting machine in one position thereon.

One or more of the cables of the machine may be hooked at the rear end of the truck and the drums operated to draw the machine thereon to the position shown in Figures 2 and 3. At the front end of the truck is a U-frame 36 sufficiently high to provide clearance between the floor of the truck and the top of the frame so that the cutting machine may be revolved therein about its longitudinal axis. At the top of the frame 36 is a pulley or guide 38 preferably disposed toward one side of the frame 36. On the front of the body 1 of the cutting machine is a hook 40. This hook is disposed toward one side of the machine and near the horizontal center line for purposes later to be described.

When the machine is positioned on the truck, as illustrated in Figures 2 and 3, the cable on either the drum 4 or 6 is passed around the pulley 38 of the frame, the free end of the cable being connected to the lug or hook 40. As the drum 6 is operated to wind up the cable the machine is moved bodily forward on the truck to position the lug 40 substantially under the pulley 38. As the cable is additionally wound on the drum, it lifts up the front end of the machine. Since the hook 40 is positioned at one side of the longitudinal center of the machine and substantially at the horizontal center of one side of the machine, this lifting movement turns the machine through 90°, thus disposing the cutter in a vertical plane, the hook 40 assuming a position at the vertical center of the machine as thus oriented. As the lifting movement continues, the front end of the machine is hoisted up to the position illustrated in Fig. 5 and a rocking shaft 42 is passed thereunder, suitable brackets 44 and 46 being provided on the machine and on the frame 36 respectively to receive the shaft. In this position the machine is ready to begin a vertical cut. The cable 25 is then removed from the hook 40 and pulley 38 and fastened to the hook 39, as illustrated by the dot and dash line in Fig. 5. The truck 24 is moved forwardly by hand or by any one of the usual and well known power-driven trucks or pushers for this purpose to force the continuously rotating cutter arm for its full depth into the end wall. The drum 6 is then further operated to take up additional slack on the cable, thus hoisting up the rear end of the machine and rocking it about the shaft 42, and forcing the cutter downwardly in an arcuate sweep. This action continues until the cutter is driven into the bottom of the cut. While so held, the machine may be backed out, thus giving a full depth cut longitudinally of the room or seam, or it may be hoisted when the forward end has reached the bottom of the cut, thus leaving a downwardly and forwardly sloping bottom wall at the kerf bottom, as indicated at 48 in Fig. 6. This base wall portion of the kerf provides some support for the separated portions of the coal or material. Obviously in this manner any number of vertical kerfs may be formed merely by shifting the truck laterally in the room and then placing the machine thereon.

Since the cutter arm is disposed near the bottom of the machine and substantially in the plane of the bottom thereof, and the machine can be turned over onto either side as described, two separated kerfs may be formed with one positioning of the truck.

Suitable lateral supporting wedges or removable brackets, such as 50, may be provided on the truck to hold the cutting machine rigidly in any one of its predetermined positions thereon.

In case it is desired to cut kerfs disposed at an angle to both horizontal and vertical, a plurality of brackets 46, which are adjustable may be provided on each side of the frame 36 so as to receive and hold the rock shaft at various angles to and heights above the floor. In this manner, in combination with a cutting machine which moves about on its own bottom on the bottom of the mine shaft longitudinally and laterally, a truck is provided with which the machine can be conveniently rotated about its longitudinal axis to position a different face towards the bottom of the mine room, and thus position the orbital cutter in horizontal, vertical or intermediate positions, and which supports the machine rockably on a transverse axis for swinging the cutter through an arcuate path in a vertical or inclined plane. Thus, all of the efficiency, economy, compactness and simplicity of the horizontal kerf cutting machine are obtained, and with very slight additional expense it is possible to use the machine for cutting horizontal, vertical or inclined kerfs, thus combining the advantages of the simple horizontal cutter with the theoretical advantages of the rotatable head or turntable kerf cutter.

Figure 7:
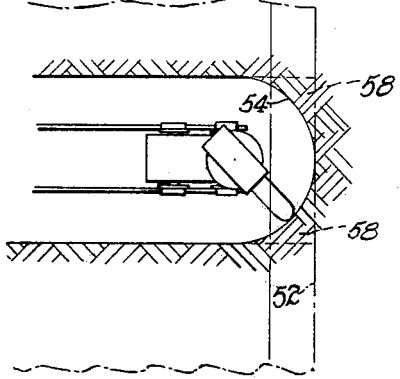
Fig. 7 is a diagrammatic representation of the manner of cutting with pivotal head cutters.

Consequently, a horizontal rectangular cut of full width clear to the side walls as indicated by the dot and dash line 52 in Fig. 1 may be made. In the turntable type of machine the rear wall of the cut would be arcuate, as indicated at 54 and limited in width, in Fig. 7 wherein the line 52 is shown for purposes of comparison. Obviously in the case of the pivoted cutter, a large amount of material is left uncut at the rear corner portions of the kerf, as outlined by the dotted line 58, and this material is broken or shattered in removal, making removal more difficult and resulting in a considerable percentage of loss of large lumps. It is apparent therefore that the present apparatus has many advantages over the structures heretofore used.

I claim:

1. The combination with a mining machine slidable sidewise upon its own bottom upon a mine bottom and having an orbital cutter projecting fixedly therefrom in alignment with the major dimension thereof and lying in a plane substantially parallel to the mine bottom, of means for bodily hoisting and concurrently turning the machine to dispose the bottom at an angle to the mine bottom, and means for rockably supporting said machine on an axis transversely of the machine after the hoisting and turning operations and during cutting, whereby the cutter may be swung in a path in a plane angularly disposed to the first mentioned plane.

2. The combination with a mining machine, having a self-included motive means and slidable upon its own bottom on a mine bottom during cutting and having an orbital cutter projecting therefrom, of means to rockably support the machine with a different face nearest the mine bottom, said means including a frame, brackets on said frame transversely aligned and adapted to receive a shaft, means on said frame and operable by the motive means of the machine to lift the machine bodily and turn the machine about its longitudinal axis to dispose another side nearest the mine bottom, and a shaft through said brackets engaging a side of the machine.

3. The combination with a mining machine having a self-included motor means and a cutter bar projecting from one end of said machine and near the base thereof and normally disposed in a substantially horizontal plane, said machine being slidable upon its own bottom longitudinally and transversely upon the mine floor, of hoisting and supporting means for disposing said machine with a side face nearest the mine bottom, said means including a vertically extending frame, means carried by said frame and cooperating with the motive means of the cutting machine for turning the cutting machine through an angle about its longitudinal axis and for concurrently lifting the machine bodily from the supporting means to dispose the cutter bar in a vertical plane.

4. The combination with a mining machine, having a longitudinal orbital cutter and slidable upon a mine bottom transversely and longitudinally during the cutting operation and having a self-contained motive means and drums operated thereby and cables associated with the drums and adapted to be connected to anchors about the mine for moving the cutter, of means for turning the machine about its longitudinal axis for disposing the orbital cutter at an angle to the horizontal and for rockably supporting the machine in such position, said means including a vertically extending rigid frame, and means on said frame associated with said cables for lifting the machine bodily with its own power and tilting it through an angle about a transverse axis, and brackets on said frame and on one side face of said machine, said brackets being alignable with the brackets of the frame to receive a shaft for securing the machine and frame rockably together in the turned position.

5. A mining apparatus including a mining machine having a self-included power mechanism and slidable on its own bottom on a mine floor for cutting kerfs substantially parallel to the floor, and means coacting with said power mechanism for hoisting the machine from the mine floor and rotating it about a longitudinal axis to dispose a different face of the machine toward the mine floor, and means for supporting said machine in the rotated position for rocking movement about a transverse axis, and means coacting with said power mechanism for rocking the machine about said transverse axis.

6. An apparatus for mining including means for cutting a horizontal kerf substantially at the level of a mine floor, said means comprising a mining machine having an orbital cutter and self-included power mechanism and being slidable bodily transversely of the mine room on its own bottom by its own power during said cutting operation, and means coacting with the said power mechanism for bodily lifting said machine from said floor and rotating said machine about a longitudinal axis to dispose the orbital cutter at an angle to the plane of said kerf and means for rockably supporting the machine in the rotated position for cutting a kerf angularly disposed to the plane of the first mentioned kerf.

7. An apparatus for mining coal, comprising means including a longitudinally extending orbital cutter for cutting a kerf substantially parallel to the mine floor into the end wall of a mine transversely of the mine room and substantially constant depth into the end wall for the full width of the room, and means coacting with said first mentioned means for withdrawing said cutter from the kerf and lifting said means and cutter bodily from the mine floor and for rotating the said means and cutter about a longitudinal axis to dispose the orbital cutter at an angle to said kerf and for rockably supporting said means with the cutter in said last mentioned position.

8. The combination with a mining machine having a self-included power means and cables operable thereby for moving the machine about on its own bottom on a mine floor for cutting kerfs transversely of a mine room, of means coacting with said cables for hoisting said machine bodily from the mine floor by its own power and rotating the said machine about a longitudinal axis to dispose a different face toward the mine floor, and transversely extending pivot means for rockably supporting said machine in the rotated position, and additional means operably associated with said cables for rocking said machine by its own power about said transversely extending pivot means.

9. The combination with a mining machine slidable sidewise upon its own bottom upon a mine bottom and having an orbital cutter projecting fixedly therefrom in alignment with the major dimension thereof and lying in a plane substantially parallel to the mine bottom, of means for bodily hoisting and concurrently turning the machine to dispose the bottom at an angle to the mine bottom, and a shaft for rockably supporting said machine on an axis transversely of the machine after the hoisting and turning operations and during cutting, whereby the cutter may be swung in a plane angularly disposed to the first mentioned plane, said shaft having its axis angularly adjustable.

10. The combination with a mining machine slidable sidewise upon its own bottom upon a mine bottom and having an orbital cutter projecting fixedly therefrom in alignment with the major dimension thereof and lying in a plane substantially parallel to the bottom, of means for bodily hoisting and concurrently turning the machine to dispose the bottom at an angle to the mine bottom, and means for rockably supporting said machine on an axis transversely of the machine after the hoisting and turning operations and during cutting, whereby the cutter may be swung in a plane angularly disposed to the first mentioned plane, and means operable by the motive means of the machine for swinging the cutter in said angularly disposed plane.

In testimony whereof, I hereunto affix my signature.

JOSEPH C. NELMS.